US012792212B2

(12) United States Patent
Vergis et al.

(10) Patent No.: US 12,792,212 B2
(45) Date of Patent: Nov. 10, 2026

(54) MEMORY MODULE MANAGEMENT DEVICE

(71) Applicant: Intel Corporation, Santa Clara, CA (US)

(72) Inventors: George Vergis, Portland, OR (US); Saravanan Sethuraman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/074,417

(22) Filed: Dec. 2, 2022

(65) Prior Publication Data

US 2023/0103368 A1 Apr. 6, 2023

(51) Int. Cl.
*G06F 3/06* (2006.01)

(52) U.S. Cl.
CPC ............ *G06F 3/061* (2013.01); *G06F 3/0622* (2013.01); *G06F 3/0656* (2013.01); *G06F 3/0679* (2013.01)

(58) Field of Classification Search
CPC ...... G06F 3/061; G06F 3/0622; G06F 3/0656; G06F 13/1668
See application file for complete search history.

(56) References Cited

U.S. PATENT DOCUMENTS

| | | | | |
|---|---|---|---|---|
| 2022/0076721 | A1* | 3/2022 | Leslie | G11C 5/06 |
| 2022/0308796 | A1* | 9/2022 | Patriarca | G06F 3/0652 |
| 2023/0161599 | A1* | 5/2023 | Erickson | G06F 21/554 713/1 |
| 2023/0239165 | A1* | 7/2023 | Young | H04L 9/3265 713/175 |
| 2024/0111454 | A1* | 4/2024 | Hinkle | G06F 3/0607 |
| 2025/0348238 | A1* | 11/2025 | Prather | G06F 1/3275 |

* cited by examiner

*Primary Examiner* — Edward J Dudek, Jr.
(74) *Attorney, Agent, or Firm* — Compass IP Law PC

(57) ABSTRACT

A memory module management device and associated apparatus and methods. The device integrates multiple blocks and components on a substrate, including a host input/output (I/O) interface coupled to a host-side port, a power management component, and a device-side I/O interface and router coupled to a plurality of device-side I/O ports. The device is configured to be mounted on a memory module having a plurality of Dynamic Random Access Memory (DRAM) devices that are coupled to the device-side I/O ports and execute firmware instructions on a processing element to facilitate communication between a host in which the memory module is installed and the plurality of DRAM devices using sideband communication. Sideband communication between the host and data buffers and thermal sensors on the memory module are also supported. The device also may be configured to provide scratchpad memory and/or a mailbox. Authentication of the firmware instructions is also supported.

20 Claims, 6 Drawing Sheets

MEMORY MODULE MANAGEMENT DEVICE

BACKGROUND INFORMATION

Recent generations of Dynamic Random Access Memory (DRAM) devices (DRAMs) and DRAM modules have added extended functionality relative to earlier generation DRAMs and modules. To support the extended functionality, various discrete components are implemented on DRAM modules, such as a Serial Presence Detect (SPD) chip and hub chip, an SPD hub chip, an authentication component (that may be the SPD (hub) chip), (or a processing element running firmware to perform authentication), and a Power Management Integrated Circuit (PMIC) chip.

A fundamental issue with this approach is the manageability and strict sequencing requirements associated with each component. In some implementations, all the manageability devices are connected using a standard sideband interface, such as I2C or I3C. The host has to pass through the SPD hub to reach the PMIC. The same PMIC has to power up the SPD hub. That means the PMIC has to permanently power the SPD hub for the host to be able to manage the PMIC, resulting in a chicken and egg issue: Hub must be powered by the PMIC, but the PMIC needs to power the hub so that it itself can be controlled). This results in the PMIC always being on and wasting power in power sensitive applications. In case of an error with SPD/hub, this will affect the path to the PMIC, preventing it from being reached.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
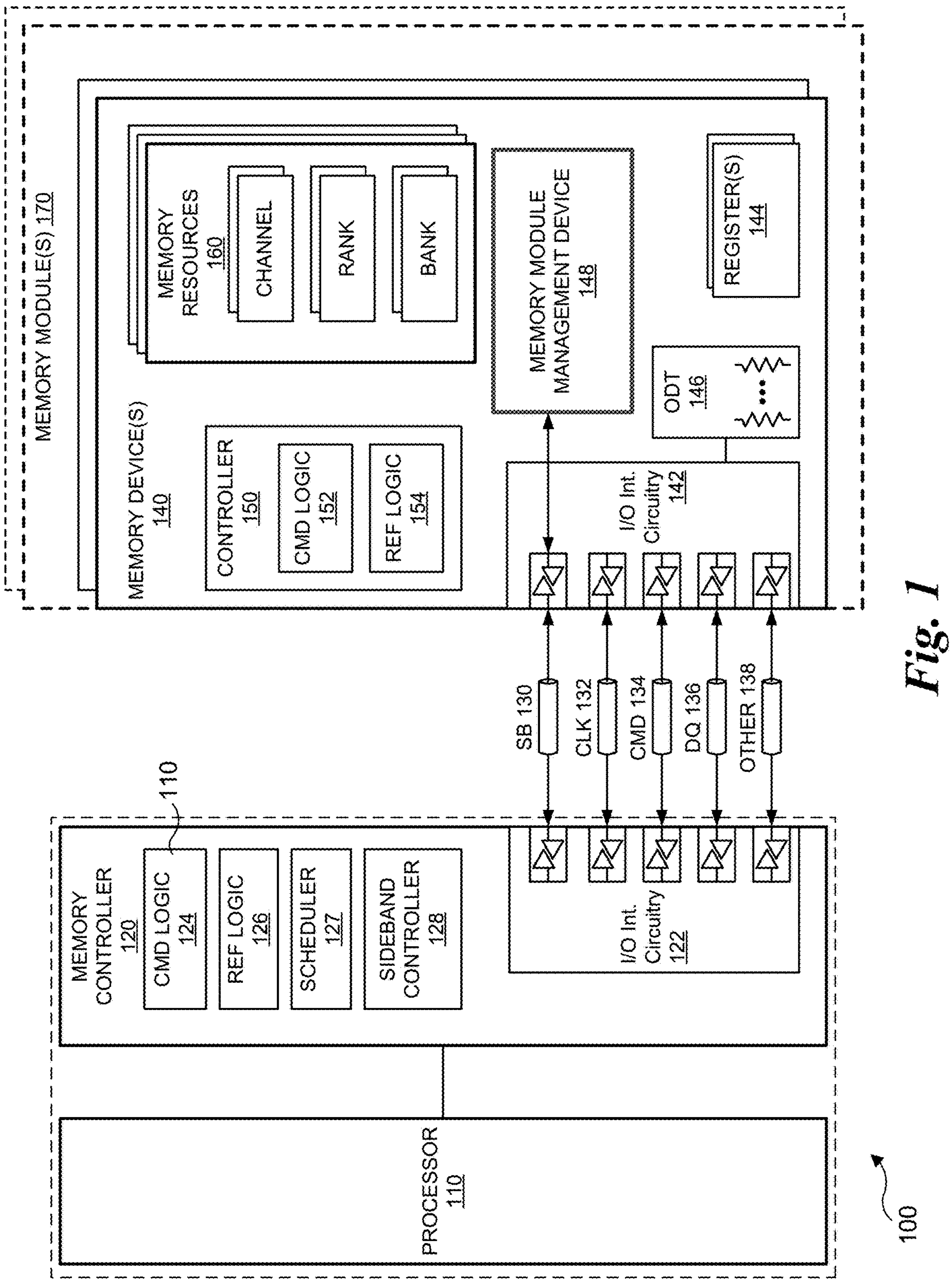
FIG. 1 is a schematic diagram of an example system including a memory controller and memory modules configured including a memory module management device, according to one embodiment.

Embodiments of a memory module management device and associated apparatus and methods are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, a memory module management device is provided that consolidates existing discrete devices on a memory module such as SPD, Hub, Authentication, and PMIC into a single component that are interconnected on a monolithic device, for greater efficiency and flexibility. Further, the embodiments add new functions to manage the integration and potential security challenges.

As described herein, reference to memory devices can apply to different memory types. Memory devices may refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes dynamic random access memory (DRAM), or some variant such as synchronous DRAM (SDRAM). A memory subsystem as described herein may be compatible with a number of memory technologies or standards, such as DDR3 (double data rate version 3, JESD79-3, originally published by JEDEC (Joint Electronic Device Engineering Council) on Jun. 27, 2007), DDR4 (DDR version 4, JESD79-4, originally published in September 2012 by JEDEC), LPDDR3 (low power DDR version 3, JESD209-3B, originally published in August 2013 by JEDEC), LPDDR4 (low power DDR version 4, JESD209-4, originally published by JEDEC in August 2014), WI/O2 (Wide I/O 2 (WideI/O2), JESD229-2, originally published by JEDEC in August 2014), HBM (high bandwidth memory DRAM, JESD235, originally published by JEDEC in October 2013), LPDDR5 (originally published by JEDEC in February 2019), HBM2 ((HBM version 2), originally published by JEDEC in December 2018), DDR5 (DDR version 5, originally published by JEDEC in July 2020), DDR6 (currently under proposal) LPDDR6 (currently under proposal) or others or combinations of memory technologies, and technologies based on derivatives or extensions of such specifications.

Figure 5:
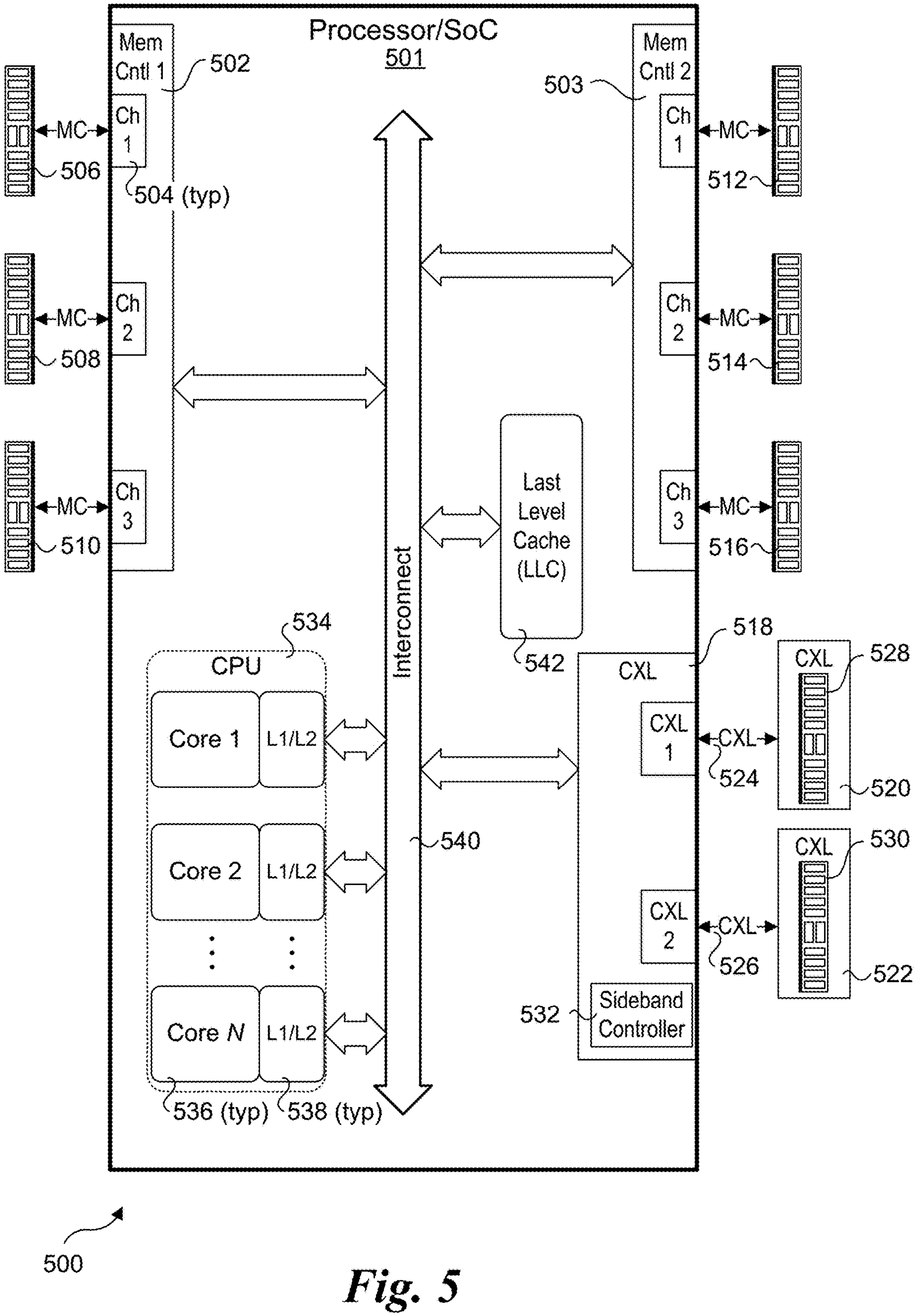
FIG. 5 is a schematic diagram illustrating one embodiment of a compute node including multiple memory channels and multiple CXL interfaces coupled to local memory devices.

Other memory types or memory devices and modules include GDDR (Graphics Double Data Rate) SDRAM memory devices and modules and CXL (Compute Express Link) memory modules and cards. The GDDR SDRAM standards include GDDR5, GDDR5X, GDDR6, and GDDR6X (all published by JEDEC). CXL is a protocol that is implemented over a physical PCIe (Peripheral Component Interconnect Express) link called a CLX flex bus or CXL link. Generally, a CXL module or card may use various types of the aforementioned memory devices. CXL modules include CXL DIMMs, such as illustrated in FIG. 5 below.

FIG. 1 illustrates an example system 100. In some examples, as shown in FIG. 1, system 100 includes a processor and elements of a memory subsystem in a computing device. Processor 110 represents a processing unit of a computing platform that may execute an operating system (OS) and applications, which can collectively be referred to as the host or the user of the memory subsystem. The OS and applications execute operations that result in memory accesses. Processor 110 can include one or more separate processors. Each separate processor may include a single processing unit, a multicore processing unit, or a combination. The processing unit may be a primary processor such as a central processing unit (CPU), a peripheral processor such as a graphics processing unit (GPU), or a combination. The processing unit may also be an "Other Processing Unit" (XPU), as discussed below. Memory accesses may also be initiated by devices such as a network controller or storage medium controller. Such devices may be integrated with the processor in some systems or attached to the processer via a bus (e.g., a PCIe bus), or a combination. System 100 may be implemented as a System on a Chip (SoC) or may be implemented with standalone components.

Reference to memory devices may apply to different memory types. Memory devices often refers to volatile memory technologies such as DRAM. In addition to, or alternatively to, volatile memory, in some examples, reference to memory devices can refer to a nonvolatile memory device whose state is determinate even if power is interrupted to the device. In one example, the nonvolatile memory device is a block addressable memory device, such as NAND or NOR technologies. A memory device may also include byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

Descriptions herein referring to a "RAM" or "RAM device" can apply to any memory device that allows random access, whether volatile or nonvolatile. Descriptions referring to a "DRAM", "SDRAM, "DRAM device" or "SDRAM device" may refer to a volatile random access memory device. The memory device, SDRAM or DRAM may refer to the die itself, to a packaged memory product that includes one or more dies, or both. In some examples, a system with volatile memory that needs to be refreshed may also include at least some nonvolatile memory.

Memory controller 120, as shown in FIG. 1, may represent one or more memory controller circuits or devices for system 100. Also, memory controller 120 may include logic and/or features that generate memory access commands in response to the execution of operations by processor 110. In some examples, memory controller 120 may access one or more memory device(s) 140. For these examples, memory device(s) 140 may be SDRAM devices in accordance with any referred to above. Memory device(s) 140 may be organized and managed through different channels (or subchannels), where these channels/subchannels may couple in parallel to multiple memory devices via buses and signal lines. Each channel/subchannel may be independently operable. Thus, separate channels/subchannels may be independently accessed and controlled, and the timing, data transfer, command and address exchanges, and other operations may be separate for each channel/subchannel. Coupling may refer to an electrical coupling, communicative coupling, physical coupling, or a combination of these. Physical coupling may include direct contact. Electrical coupling, for example, includes an interface or interconnection that allows electrical flow between components, or allows signaling between components, or both. Communicative coupling, for example, includes connections, including wired or wireless, that enable components to exchange data.

According to some examples, settings for each channel are controlled by separate mode registers or other register settings. For these examples, memory controller 120 may manage a separate memory channel, although system 100 may be configured to have multiple channels managed by a single memory controller, or to have multiple memory controllers on a single channel. In one example, memory controller 120 is part of processor 110, such as logic and/or features of memory controller 120 are implemented on the same die or implemented in the same package space as processor 110.

Memory controller 120 includes one or more sets (one of which is shown) of I/O interface circuitry 122 to couple to a memory bus, such as a memory channel as referred to above. I/O interface circuitry 122 (as well as I/O interface circuitry 142 of memory device(s) 140) may include pins, pads, connectors, signal lines, traces, or wires, or other hardware to connect the devices, or a combination of these. I/O interface circuitry 122 may include a hardware interface. As shown in FIG. 1, I/O interface circuitry 122 includes at least drivers/transceivers for signal lines. Commonly, wires within an integrated circuit interface couple with a pad, pin, or connector to interface signal lines or traces or other wires between devices. I/O interface circuitry 122 can include drivers, receivers, transceivers, or termination, or other circuitry or combinations of circuitry to exchange signals on the signal lines between memory controller 120 and memory device(s) 140. The exchange of signals includes at least one of transmit or receive. While shown as coupling I/O interface circuitry 122 from memory controller 120 to I/O interface circuitry 142 of memory device(s) 140, it will be understood that in an implementation of system 100 where groups of memory device(s) 140 are accessed in parallel, multiple memory devices can include I/O interface circuitry to the same interface of memory controller 120. In an implementation of system 100 including one or more memory module(s) 170, I/O interface circuitry 142 may include interface hardware of memory module(s) 170 in addition to interface hardware for memory device(s) 140. Other memory controllers 120 may include multiple, separate interfaces to one or more memory devices of memory device(s) 140.

In some examples, memory controller 120 may be coupled with memory device(s) 140 via multiple signal lines. The multiple signal lines may include at least a sideband (SB) signals 130, clock (CLK) 132, a command/address (CMD) 134, and write data (DQ) and read data (DQ) 136, and zero or more other signal lines 138. According to some examples, a composition of signal lines coupling memory controller 120 to memory device(s) 140 may be referred to collectively as a memory bus. The signal lines for CMD 134 may be referred to as a "command bus", a "C/A bus" or an ADD/CMD bus, or some other designation indicating the transfer of commands. The signal lines for DQ 136 may be referred to as a "data bus".

According to some examples, independent channels may have different clock signals, command buses, data buses, and other signal lines. For these examples, system 100 may be considered to have multiple "buses," in the sense that an independent interface path may be considered a separate bus. It will be understood that in addition to the signal lines shown in FIG. 1, a bus may also include at least one of strobe signaling lines, alert lines, auxiliary lines, or other signal lines, or a combination of these additional signal lines. It will also be understood that serial bus technologies can be used for transmitting signals between memory controller 120 and memory device(s) 140. An example of a serial bus technology is 8B10B encoding and transmission of high-speed data with embedded clock over a single differential pair of signals in each direction. In some examples, CMD 134 represents signal lines shared in parallel with multiple memory device (s) 140. In other examples, multiple memory devices share encoding command signal lines of CMD 134, and each has a separate chip select (CS_n) signal line to select individual memory device(s) 140.

In some examples, the bus between memory controller 120 and memory device(s) 140 includes a subsidiary command bus routed via signal lines included in CMD 134 and a subsidiary data bus to carry the write and read data routed via signal lines included in DQ 136. In some examples, CMD 134 and DQ 136 may separately include bidirectional lines. In other examples, DQ 136 may include unidirectional write signal lines to write data from the host to memory and unidirectional lines to read data from the memory to the host.

According to some examples, in accordance with a chosen memory technology and system design, signals lines included in other 138 may augment a memory bus or subsidiary bus. For example, strobe line signal lines for a DQS. Based on a design of system 100, or memory technology implementation, a memory bus may have more or less bandwidth per memory device included in memory device(s) 140. The memory bus may support memory devices included in memory device(s) 140 that have either an x32 interface, an x16 interface, an x8 interface, an x4 interface, or multiple x2 interfaces or other interface. The convention "xW," where W is an integer that refers to an interface size or width of the interface of memory device(s) 140, which represents a number of signal lines to exchange data with memory controller 120. The interface size of these memory devices may be a controlling factor on how many memory devices may be used concurrently per channel in system 100 or coupled in parallel to the same signal lines. In some examples, high bandwidth memory devices, wide interface memory devices, or stacked memory devices, or combinations, may enable wider interfaces, such as a x128 interface, a x256 interface, a x512 interface, a x1024 interface, or other data bus interface width.

In some examples, SB signals 130 may include a SB clock and SB data signal. For instance, in some embodiments SB signals 130 comprises an I2C or I3C bus. Optionally, other existing or future sideband signals may be used.

In some examples, memory device(s) 140 and memory controller 120 exchange data over a data bus via signal lines included in DQ 136 in a burst, or a sequence of consecutive data transfers. The burst corresponds to a number of transfer cycles, which is related to a bus frequency. A given transfer cycle may be a whole clock cycle for transfers occurring on a same clock or strobe signal edge (e.g., on the rising edge). In some examples, every clock cycle, referring to a cycle of the system clock, may be separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length 8 (BL8), and each memory device(s) 140 can transfer data on each UI. Thus, a x8 memory device operating on BL8 can transfer 64 bits of data (8 data signal lines times 8 data bits transferred per line over the burst). It will be understood that this simple example is merely an illustration and is not limiting.

According to some examples, memory device(s) 140 represent memory resources for system 100. For these examples, each memory device included in memory device (s) 140 is a separate memory die. Separate memory devices may interface with multiple (e.g., 2) channels per device or die. A given memory device of memory device(s) 140 may include I/O interface circuitry 142 and may have a bandwidth determined by an interface width associated with an implementation or configuration of the given memory device (e.g., x16 or x8 or some other interface bandwidth). I/O interface circuitry 142 may enable the memory devices to interface with memory controller 120. I/O interface circuitry 142 may include a hardware interface and operate in coordination with I/O interface circuitry 122 of memory controller 120.

In some examples, multiple memory device(s) 140 may be connected in parallel to the same command and data buses (e.g., via CMD 134 and DQ 136). In other examples, multiple memory device(s) 140 may be connected in parallel to the same command bus but connected to different data buses. For example, system 100 may be configured with multiple memory device(s) 140 coupled in parallel, with each memory device responding to a command, and accessing memory resources 160 internal to each memory device. For a write operation, an individual memory device of memory device(s) 140 may write a portion of the overall data word, and for a read operation, the individual memory device may fetch a portion of the overall data word. As non-limiting examples, a specific memory device may provide or receive, respectively, 8 bits of a 128-bit data word for a read or write operation, or 8 bits or 16 bits (depending for a x8 or a x16 device) of a 256-bit data word. The remaining bits of the word may be provided or received by other memory devices in parallel.

According to some examples, memory device(s) 140 may be disposed directly on a motherboard or host system platform (e.g., a PCB (printed circuit board) on which processor 110 is disposed) of a computing device. Memory device(s) 140 may be organized into memory module(s) 170. In some examples, memory module(s) 170 may represent dual inline memory modules (DIMMs). In some examples, memory module(s) 170 may represent other organizations or configurations of multiple memory devices that share at least a portion of access or control circuitry, which can be a separate circuit, a separate device, or a separate board from the host system platform. In some examples, memory module(s) 170 may include multiple memory device(s) 140, and memory module(s) 170 may include support for multiple separate channels to the included memory device(s) 140 disposed on them.

In some examples, memory device(s) 140 may be incorporated into a same package as memory controller 120. For example, incorporated in a multi-chip-module (MCM), a package-on-package with through-silicon via (TSV), or other techniques or combinations. Similarly, in some examples, memory device(s) 140 may be incorporated into memory module(s) 170, which themselves may be incorporated into the same package as memory controller 120. It will be appreciated that for these and other examples, memory controller 120 may be part of or integrated with processor 110.

As shown in FIG. 1, in some examples, memory device(s) 140 include memory resources 160. Memory resources 160 may represent individual arrays of memory locations or storage locations for data. Memory resources 160 may be managed as rows of data, accessed via wordline (rows) and bitline (individual bits within a row) control. Memory resources 160 may be organized as separate channels, ranks, and banks of memory. Channels may refer to independent control paths to storage locations within memory device(s) 140. Ranks may refer to common locations across multiple memory devices (e.g., same row addresses within different memory devices). Banks may refer to arrays of memory locations within a given memory device of memory device (s) 140. Banks may be divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to access memory resources 160. For example, the same physical memory locations can be accessed over a specific channel as a specific bank, which can also belong to a rank. Thus, the organization of memory resources 160 may be understood in an inclusive, rather than exclusive, manner.

According to some examples, as shown in FIG. 1, memory device(s) 140 include one or more register(s) 144. Register(s) 144 may represent one or more storage devices or storage locations that provide configuration or settings for operation memory device(s) 140. In one example, register(s) 144 may provide a storage location for memory device(s) 140 to store data for access by memory controller 120 as part of a control or management operation. For example, register (s) 144 may include one or more mode registers (MRs) and/or may include one or more multipurpose registers.

In some examples, writing to or programming one or more registers of register(s) 144 may configure memory device(s) 140 to operate in different "modes". For these examples, command information written to or programmed to the one or more registers may trigger different modes within memory device(s) 140. Additionally, or in the alternative, different modes can also trigger different operations from address information or other signal lines depending on the triggered mode. Programmed settings of register(s) 144 may indicate or trigger configuration of I/O settings. For example, configuration of timing, termination, on-die termination (ODT), driver configuration, or other I/O settings.

According to some examples, memory device(s) 140 includes ODT 146 as part of the interface hardware associated with I/O interface circuitry 142. ODT 146 may provide settings for impedance to be applied to the interface to specified signal lines. For example, ODT 146 may be configured to apply impedance to signal lines included in DQ 136 or CMD 134. The ODT settings for ODT 146 may be changed based on whether a memory device of memory device(s) 140 is a selected target of an access operation or a non-target memory device. ODT settings for ODT 146 may affect timing and reflections of signaling on terminated signal lines included in, for example, CMD 134 or DQ 136. Control over ODT setting for ODT 146 can enable higher-speed operation with improved matching of applied impedance and loading. Impedance and loading may be applied to specific signal lines of I/O interface circuitry 142, 122 (e.g., CMD 134 and DQ 136) and is not necessarily applied to all signal lines.

In some examples, as shown in FIG. 1, memory device(s) 140 includes controller 150. Controller 150 may represent control logic within memory device(s) 140 to control internal operations within memory device(s) 140. For example, controller 150 decodes commands sent by memory controller 120 and generates internal operations to execute or satisfy the commands. Controller 150 may be referred to as an internal controller and is separate from memory controller 120 of the host. Controller 150 may include logic and/or features to determine what mode is selected based on programmed or default settings indicated in register(s) 144 and configure the internal execution of operations for access to memory resources 160 or other operations based on the selected mode. Controller 150 generates control signals to control the routing of bits within memory device(s) 140 to provide a proper interface for the selected mode and direct a command to the proper memory locations or addresses of memory resources 160. Controller 150 includes command (CMD) logic 152, which can decode command encoding received on command and address signal lines. Thus, CMD logic 152 can be or include a command decoder. With command logic 152, a memory device can identify commands and generate internal operations to execute requested commands.

In some examples, memory device(s) 140 include memory module management device 148. In the illustrated embodiment, memory controller 120 interfaces with memory module management device 148 via SB signals 130. Memory module management device 148, which is the focus of this disclosure, is described and illustrated in further detail below.

Referring again to memory controller 120, memory controller 120 includes CMD logic 124, which represents logic and/or features to generate commands to send to memory device(s) 140. The generation of the commands can refer to the command prior to scheduling, or the preparation of queued commands ready to be sent. Generally, the signaling in memory subsystems includes address information within or accompanying the command to indicate or select one or more memory locations where memory device(s) 140 should execute the command. In response to scheduling of transactions for memory device(s) 140, memory controller 120 can issue commands via I/O interface circuitry 122 to cause memory device(s) 140 to execute the commands. In some examples, controller 150 of memory device(s) 140 receives and decodes command and address information received via I/O interface circuitry 142 from memory controller 120. Based on the received command and address information, controller 150 may control the timing of operations of the logic, features and/or circuitry within memory device(s) 140 to execute the commands. Controller 150 may be arranged to operate in compliance with standards or specifications such as timing and signaling requirements for memory device(s) 140. Memory controller 120 may implement compliance with standards or specifications by access scheduling and control.

According to some examples, memory controller 120 includes scheduler 127, which represents logic and/or features to generate and order transactions to send to memory device(s) 140. From one perspective, the primary function of memory controller 120 could be said to schedule memory access and other transactions to memory device(s) 140. Such scheduling can include generating the transactions themselves to implement the requests for data by processor 110 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

In some examples, memory controller 120 includes refresh (REF) logic 126. REF logic 126 may be used for memory resources that are volatile and need to be refreshed to retain a deterministic state. REF logic 126, for example, may indicate a location for refresh, and a type of refresh to perform. REF logic 126 may trigger self-refresh within memory device(s) 140 or execute external refreshes which can be referred to as auto refresh commands by sending refresh commands, or a combination. According to some examples, system 100 supports all bank refreshes as well as per bank refreshes. All bank refreshes cause the refreshing of banks within all memory device(s) 140 coupled in parallel. Per bank refreshes cause the refreshing of a specified bank within a specified memory device of memory device(s) 140. In some examples, controller 150 within memory device(s) 140 includes a REF logic 154 to apply refresh within memory device(s) 140. REF logic 154, for example, may generate internal operations to perform refresh in accordance with an external refresh received from memory controller 120. REF logic 154 may determine if a refresh is directed to memory device(s) 140 and determine what memory resources 160 to refresh in response to the command.

Memory controller 120 further includes a sideband controller 128 that provides control input to memory module management device 148 via sideband signals 130. Although depicted as part of memory controller 120 in FIG. 1, under an SoC architecture, sideband controller 128 may be embedded in the SoC apart from memory controller 120.

Figure 2:
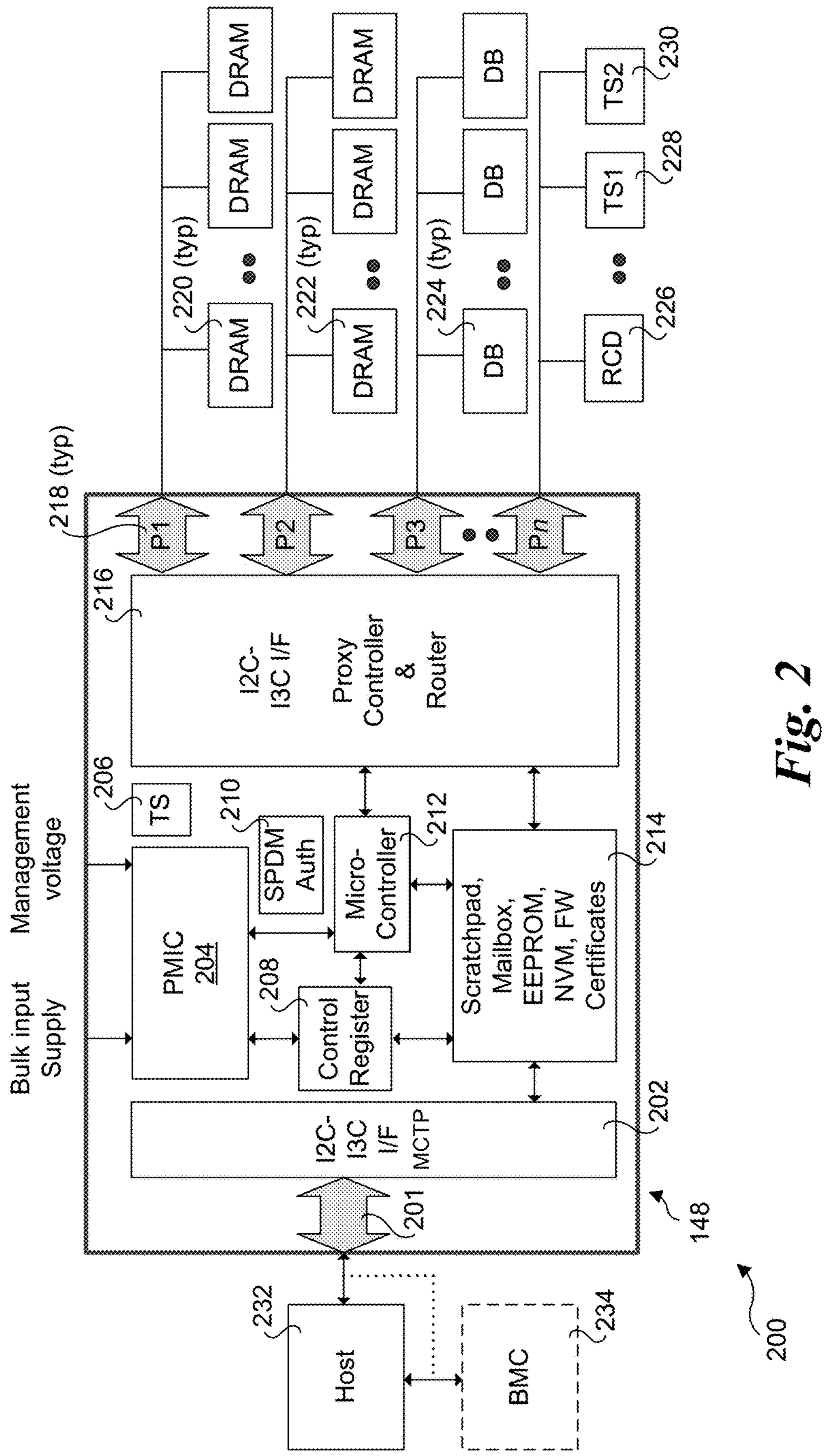
FIG. 2 is a diagram of a system including a memory module management device, according to one embodiment.

FIG. 2 shows a system 200 including a memory module management device 148, according to one embodiment. Memory module management device 148 includes an input/output (I/O) port 201, an I2C or I3C interface 202, a PMIC (Power Management Integrated Circuit) 204, a thermal sensor (TS) 206, a control registers 208, an SPDM (Security Protocol and Data Model) Authentication block 210, a microcontroller 212, a block 214 configured to support a scratchpad, mailbox, EEPROM, and operate as NVM storage in which firmware certificates are stored. Memory module management device 148 further includes proxy controller and router 216 with an integrated I2C or I3C interface coupled to n I/O ports 218, also labeled P1, P2, P3, . . . , Pn. I/O port P1 is connected to multiple DRAMs 220, while I/O port P2 is connected to DRAMs 222. I/O port P3 is connected to data buffers (DBs) 224, while I/O port Pn is connected to a Registered Clock Driver (RCD) 226 and thermal sensors 228 and 230 (also labeled TS1 and TS2).

Memory module management device 148 communicates with a host 232 via I/O port 201. Under an optional confirmation including a Baseboard Management Controller (BMC) 234, memory module management device 148 communicates with a BMC 234 via I/O port 201.

In the illustrated embodiment, I2C or I3C interface 202 employs the Management Component Transport Protocol (MCTP). MCTP is a protocol designed by the Distributed Management Task Force (DMTF) to support communications between different intelligent hardware components that make up a platform management subsystem, providing monitoring and control functions inside a managed computer system. MCTP, which is independent of the underlying physical bus or link structure, may also be used for other types of sideband buses and links in addition to I2C or I3C, such as but not limited to SMBus (System Management Bus).

In addition to logic to support a scratchpad, mailbox, EEPROM, NVM storage, etc., block 214 also includes various interfaces to communicate with I2C or I3C interface 202, control register 208, microcontroller 212, and I2C or I3C interface 216. Block 214 may include volatile memory (e.g., DRAM, SRAM, etc.) in addition to non-volatile memory is some embodiments. Microcontroller 212 is configured to communicate with block 214, control register 208, PMIC 204, and proxy controller and router 216. Microcontroller 212 is illustrative of a processing element with one or more cores or other means for executing instructions such as firmware instructions that may be stored in NVM in block 214. Microcontroller 212 also may include pre-programmed logic (e.g., ASIC circuitry) for performing one or more dedicated functions.

Memory module management device 148 can also act as a proxy controller and mailbox for a target device on the memory module such that microcontroller 212 can initiate autonomous functions such as memory channel training, configuration, calibration, etc. Such autonomous function can help accelerate the boot time as all the memory modules in the platform can simultaneously initialize, in contrast to the existing memory subsystem's reliance on platform BI/OS to sequentially initialize each memory module.

The integration of multiple function into a single component allows for more flexible internal bussing between the devices with a common control register (208), microcontroller programmable sequence, and shared volatile and non-volatile memory space for code and data. Integration saves space on the memory module, reducing component cost and validation resources.

The microcontroller programmability allows rapid deployment compared to fixed function as well as end user customization. Fixed function logic, as currently exists in memory modules, has numerous interoperability and spec compliance issues throughout the industry. With the use of microcontroller 212, industry standardization and rapid deployment can be achieved. The programmability can be applied to the I3C control plane, PMIC switching regulator parameters, power ramp rate, in-band interrupt notifications etc., which were all previously done using fixed function logic. Microcontroller 212 also can assist and execute autonomous backside training algorithms with the help of RCD and DRAM devices.

The firmware associated with microcontroller 212 may introduce security concerns. However, mutual authentication facilitated by SPDM Auth block 210 allows the host to customize the memory module functionality without compromising security—only authenticated platforms can reprogram the microcontroller firmware. The security concern can be alleviated by precluding in-system firmware updates; in this case, the device can only be programmed in a test environment with special high voltage fuse programming (legacy behavior).

Additionally, Memory module management device 148 integrates an addressable I3C router such that the multiple copies of the bus outputs can be used to connect numerous devices such as 80 or more DRAMs without loading the existing single bus down. Integration allows multiple I/O ports to be controlled and arbitrated with microcontroller 212. The individual I/O ports have access to the shared resources, both volatile and non-volatile memory. Each copy of the bus (I/O ports 218) is independently addressed through the built-in router in proxy controller and router 216. Effectively this device can work as a 1 in, N out or N in, 1 out router (bi-directional). On the host side of the interface (or on the port side), in one embodiment the MCTP protocol is used to select (route to) I/O ports 218. However, the MCTP packets can be decoded but not routed to the port side, through the device configuration registers. Additionally, Platform Level Data Model (PLDM) over MCTP and SPDM over MCTP protocol maybe supported, either on the host or the port-side interfaces.

Memory module management device 148 may also be used on the platform with appropriate firmware modifications such that it can replace the motherboard I/O VR as well as provide I3C routing between the BMC, the host, and the memory module. Doing so allows either the BMC or the host to become the bus master for the memory modules. Existing customer implementations entail use of a multiplexer (MUX) in the platform, to support multi-controller access of the memory module. However, these MUXes do not scale to higher speeds and do not support dynamic bus sharing. Memory module management device 148, through use of MCTP packet switching, allows dynamic switching between controllers as well as target devices.

Figure 3:
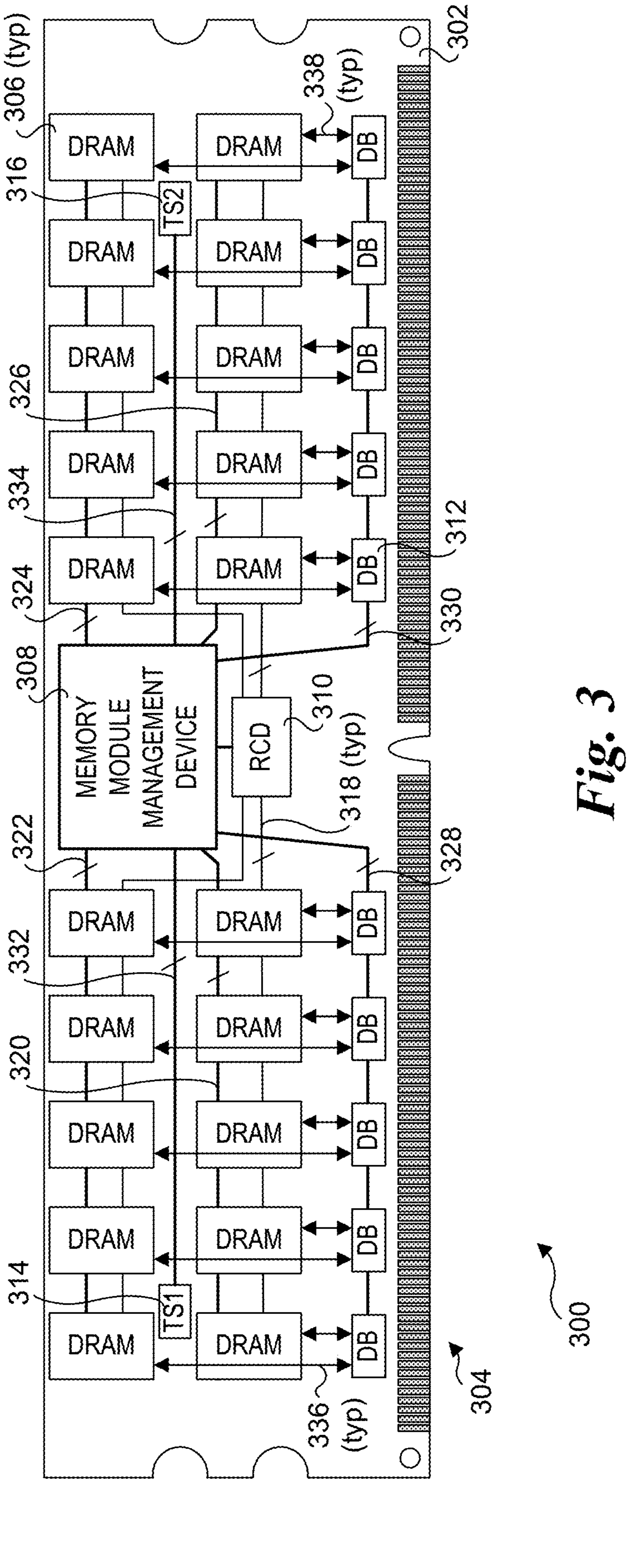
FIG. 3 is a diagram of a DIMM or DRAM-based DIMM including the memory module management device of FIG. 2, according to one embodiment.

FIG. 3 shows a Dual Inline Memory Module (DIMM) 300 including a printed circuit board (PCB) 302 with a double-sided edge connector 304. Various chips and/or packages are mounted on both sides of PCB 302; for simplicity and clarity only chips/packages on one side of DIMM 300 are shown. The chips and/or packages include DRAM chips 306 (also referred to as DRAMs), a memory module management device 308, an RCD 310, a plurality of data buffers (DB s) 312, and a pair of temperature sensors 314 and 316.

RCD is used to provide clock signals 318 to each of DRAMs 306. As depicted by sideband buses (e.g., I2C or I3C buses) 320, 322, 324, and 326, each of DRAMs 306 is connected to memory module management device 308. Likewise, as depicted by sideband buses 328 and 330, each of DBs 312 is also connected to memory module management device 308. In addition, TS 314 is connected to memory module management device 308 via a sideband bus 332, while TS 316 is connected to memory module management device 308 a sideband bus 334.

In addition to the sideband bus signals and clock signals, PCB 302 would include wiring for facilitating in-band signals comprising command signals, data signals, and optional other signals and data signals that would be coupled between pins on edge connector 304 and the various chips/packages and other circuitry. The vertical signals 336 and 338 coupled between DRAMs 306 and DBs 312 are data and strobe lines (DQ/DQS). The other circuitry may include, for example, a DIMM controller or the like, as well as various passive circuit components such as resisters, inductors, etc. In addition to the signal paths shown, there would also be signal paths from RCD 310 to DBs 312 that are not separately shown to avoid clutter. It is further noted that the signal paths shown are illustrative of some connection being present between I0 ports (not separately shown) on memory module management device 308 and various devices/components on PCB 302 do not imply these are separate connections, although they may be. For example, while I3C buses 332 and 334 are shown connecting memory module management device 308 to TS 314 and TS 316, and there is a separate line shown between memory module management device 308 and RCD 310, these signal paths may represent an I3C bus connected to a single I0 port, such as shown in FIG. 2 above and in FIG. 4 below.

Generally, the DRAMs in the Figures herein, including FIGS. 2 and 3 may be illustrated as a DRAM chip or package with a single DRAM die, or the DRAM chip or package may employ a three-dimensional memory architecture with multiple stacked DRAM die within the same package or chip. In the case of stacked DRAM dies, the DRAM packages would include internal wiring to connect the sideband signals to each of the DRAM dies in the packages. In some cases, the DRAM die(s) will be in a package such as a Ball Grid Array (BGA) package that is mounted to BGA pads on PCB 302 using known manufacturing techniques, such as a solder reflow process or the like. Similarly, memory module management device 306 may comprise a BGA package mounted to PCB 302 via mating BGA pads. Other known packaging and assembly/mounting techniques may also be used.

The DRAMs in the Figures herein may be any type of memory device referenced above in the introduction preceding the discussion of FIG. 1. In one embodiment, the DRAMs are DDR6 DRAMs. In one embodiment, the DRAMS are LPDDR5 DRAMs or LPDDR6 DRAMs. The DRAMs are also representative of future DRAM devices, such as proposed DDR7 DRAMs.

The DIMMs illustrated herein, such as in FIG. 3, may comprise various types of DIMMs such as Registered DIMMs (RDIMMs), Load Reduced DIMMs (LRDIMMs), and MRDIMMs (Multiplexed Rank Registered DIMMs (also called High Bandwidth DIMMs)).

Figure 4:
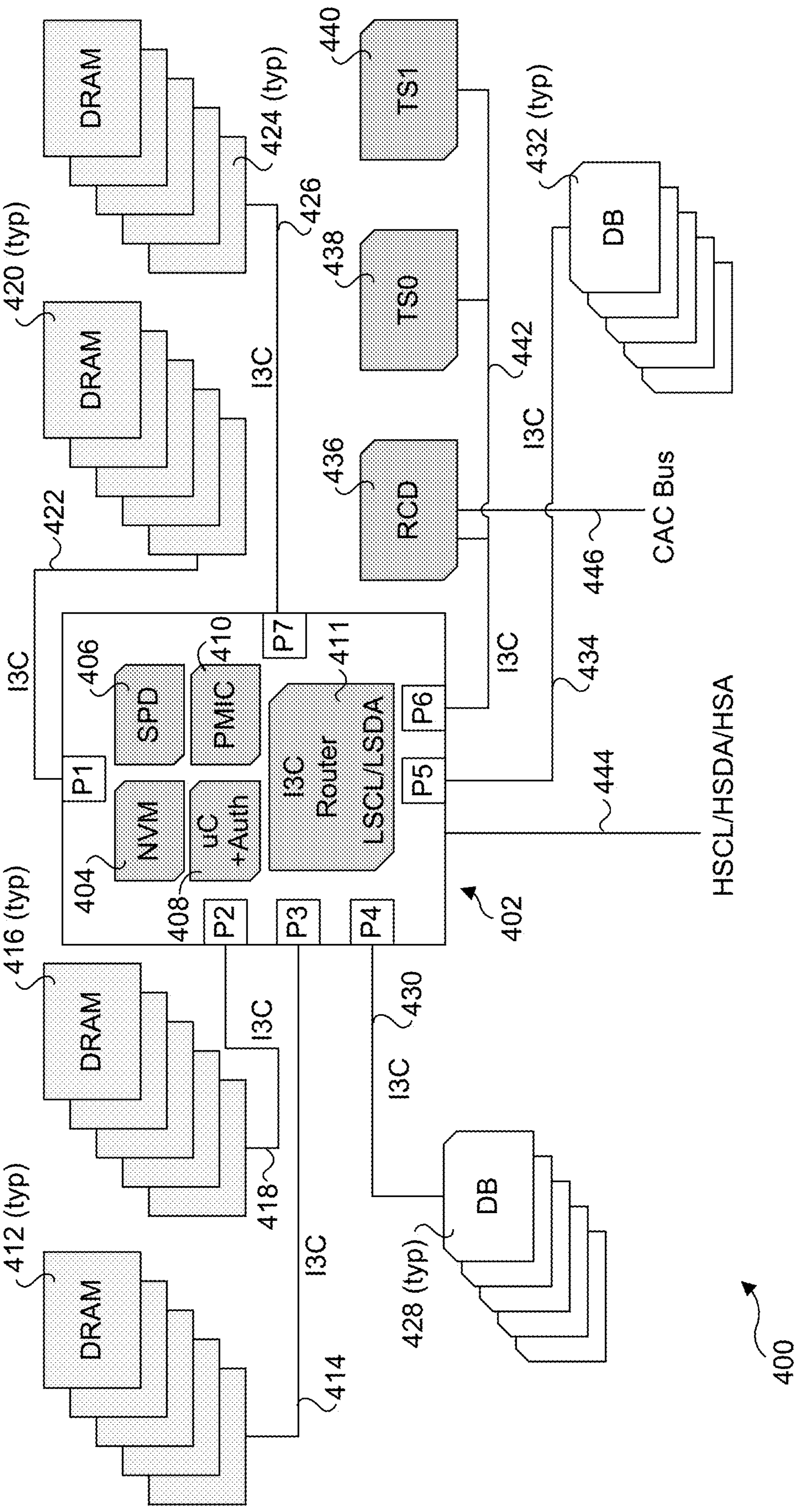
FIG. 4 is a diagram illustrating an abstracted view of the sideband topology for a memory module, according to one embodiment.

FIG. 4 shows an abstracted view 400 of the sideband topology for a memory module, according to one embodiment. At the heart of the topology is a memory module management device 402 including NVM 404, SPD 406, a microcontroller (uC) 408 programmed to support SPDM authentication, a PMIC 410, and an IC3 router 411 coupled to a plurality of device-side I/O ports P1, P2, P3, P4, P5, P6, and P7.

Port P3 is coupled to DRAMs 412 via an I3C bus 414, while Port P2 is coupled to DRAMs 416 via an I3C bus 418. Port P1 is coupled to DRAMs 420 via an I3C bus 422, while Port P7 is coupled to DRAMs 424 via an I3C bus 426. Port P4 is coupled to DBs 428 via an I3C bus 430 and port P5 is coupled to DBs 432 via an I3C bus 434. Port P6 is coupled to an RCD 436, thermal sensor 438, and thermal sensor 440 via an I3C bus 442.

Memory module management device 402 receives a host clock signal (HSCL), a host data signal (HSDA) and a host address signal (HSA), collectively depicted as a signal line 444. RCD 436 is also coupled to a Command, Address, and Control (CAC) bus 446. DRAMs 412, 416, 420, and 424 would also be coupled to in-band signals including CAC and DQ/DQS signals (not shown). Each of I3C buses 414, 418, 422, 426, 430, 434, and 442 include a local clock signal (LSCL) and a local data signal (LSDA).

FIG. 4 only shows the sideband topology for clarity. In addition to sideband signals (e.g., IC3 buses as a non-limiting example), the DIMM would also include interconnects so supported in-band signaling.

FIG. 5 shows and embodiment of compute node 500. A processor/SOC 501 includes a pair of memory controllers 502 and 503, each including three memory channels 504 (also labeled Ch(annel) 1, Ch 2, and Ch 3). Each of the memory channels 504 is coupled to a respective DIMM via a respective memory channel link (MC), including DIMMs 506, 508, 510, 512, 514, and 516. In practice, a given memory channel may be connected to one or more DIMMs, with a single DIMM being shown here for illustrative purposes and simplicity. In one embodiment, DIMMs 506, 508, 510, 512, 514, and 516 have a configuration similar to DIMM 300 discussed and illustrated above. Each of memory channels 504 will include signal lines to support sideband signals (e.g., similar to sideband signals 130 in FIG. 1), in addition to conventional memory channel signals.

Compute node 500 also includes a C×L block 518 having two CXL interfaces (CXL 1, CXL 2) connected to respective CXL devices 520 and 522 via respective CXL interconnects or flex buses 524 and 526. Respective DIMMs 528 and 530 are installed in CXL devices 520 and 522, with each DIMM being operated as a host managed device memory under the Computer Express Link specification version 1.1. As defined in this specification, host managed device memory may be implemented as a Type 3— Memory Expander or as a Type 2 Device—Device with Memory. The CXL devices 520 and 522 include a CXL interface to communicate over a CXL flex bus and a DIMM interface to communicate with the DIMM. Under an alternative configuration, DIMMs 520 and 522 may comprise CXL DIMMs having a built-in CXL interface that performs similar functions to the CXL device functions under the Computer Express Link specification. In some embodiments, one or both of CXL devices 520 and 522 is a CXL card similar including two or more CXL DIMMs.

Generally, a CXL DIMM will include a similar structure to DIMM 300, including a memory module management device. A primary difference with a CXL DIMM is it will include an edge connector with pins, signal lines, and logic configured to implement a CXL flex-bus rather than one or more memory channels or subchannels.

C×L block 518 also includes a sideband controller 532, which is configured to implement sideband operations similar to sideband controller 128. In addition to the conventional CXL signal lines, CXL flex buses 524 and 526 will include signal lines to support sideband signals, such as but not limited to an I3C bus.

Processor/SoC 501 further includes a CPU 534 comprising a plurality of processor cores 536, each with an associated Level 1 (L1) and Level 2 (L2) cache 538 and connected to an interconnect 540. A last level cache (LLC) 542 is also connected to interconnect 540, as are each of memory controllers 502 and 503, and C×L block 518. Collectively, the L1/L2 caches 538, interconnect 540, LLC 542, memory controllers 502 and 503 and DIMMs 506, 508, 510, 512, 514, and 516 form a coherent memory domain. That coherent memory domain may be extended to memory connected to CXL devices via CXL flex buses under the Computer Express Link specification, such as DIMMs 528 and 530.

Figure 6:
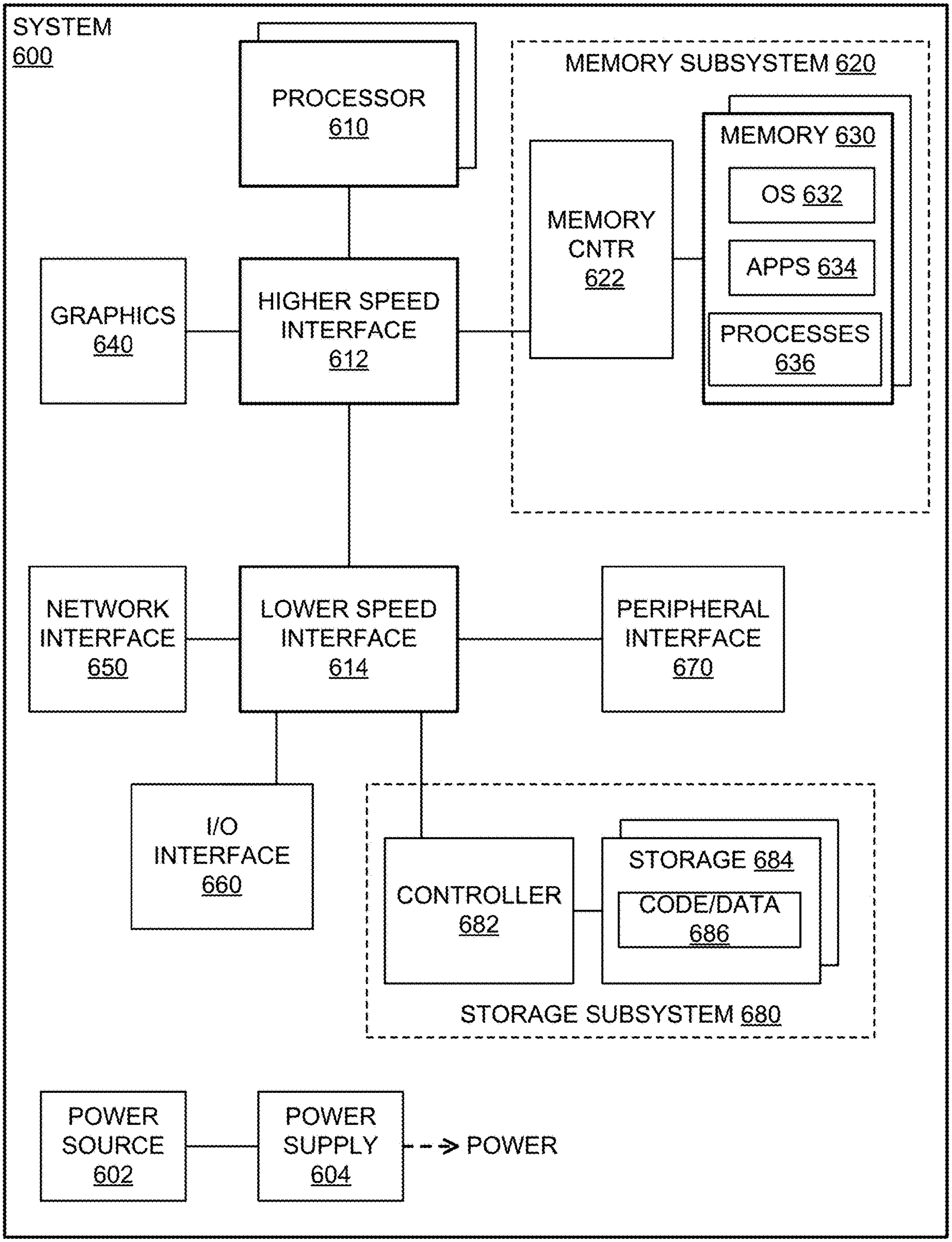
FIG. 6 is a block diagram of an example computer system, according to one embodiment.

FIG. 6 illustrates an example system 600. In some examples, system 600 may be a computing system in which a memory system may implement one or more DRAM DIMMs including a memory module management device. System 600 represents a computing device in accordance with any example described herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Memory subsystem 620 represents the main memory of system 600 and provides storage for code to be executed by processor 610, or data values to be used in executing a routine. Memory 630 of memory subsystem 620 may include one or more memory devices such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 600 includes interface 614, which can be coupled to interface 612. Interface 614 can be a lower speed interface than interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can exchange data with a remote device, which can include sending data stored in memory or receiving data to be stored in memory.

In one example, system 600 includes one or more I/O interface(s) 660. I/O interface(s) 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage subsystem 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage device(s) 684 holds code or instructions and data 686 in a persistent state (i.e., the value is retained despite interruption of power to system 600). Storage device(s) 684 can be generically considered to be a "memory," although memory 630 is typically the executing or operating memory to provide instructions to processor 610. Whereas storage device(s) 684 is nonvolatile, memory 630 can include volatile memory (i.e., the value or state of the data is indeterminate if power is interrupted to system 600). In one example, storage subsystem 680 includes controller 682 to interface with storage device(s) 684. In one example controller 682 is a physical part of interface 614 or processor 610 or can include circuits or logic in both processor 610 and interface 614.

Power source 602 provides power to the components of system 600. More specifically, power source 602 typically interfaces to one or multiple power supplies 604 in system 600 to provide power to the components of system 600. In one example, power supply 604 includes an AC to DC (alternating current to direct current) adapter to plug into a wall outlet. Such AC power can be renewable energy (e.g., solar power) power source 602. In one example, power source 602 includes a DC power source, such as an external AC to DC converter. In one example, power source 602 or power supply 604 includes wireless charging hardware to charge via proximity to a charging field. In one example, power source 602 can include an internal battery or fuel cell source.

Generally, the memory module management device may comprise a semiconductor apparatus (e.g., chip, die, package) including circuitry integrated on and/or embedded in a substrate (e.g., silicon, sapphire, gallium arsenide). The circuitry comprises a plurality of logic blocks (also referred to in the art as Intellectual Property (IP) blocks or simply 'IP'), interface circuitry, processing circuitry, and various other types of circuitry (including both digital circuitry and analog circuitry). More generally and as used herein, including the claims, various types and/or blocks of circuitry may be referred to as "IC components." Non-limiting examples of IC components include fixed logic blocks (e.g., application specific integrated circuits (ASICs) Digital Signal Processors (DSPs), etc.), programmable logic (e.g., a Field Programmable Gate Array (FPGA), programmable logic arrays, etc.), memory arrays (volatile and/or non-volatile), communication interfaces, busses, ports, etc., power circuitry, registers, controllers, processing elements, and sensors.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'n', in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding firmware components executed by an embedded processor or the like (such as, but not limited to a microcontroller). Thus, embodiments of this invention may be used as or to support firmware, executed upon some form of processor, processing core or embedded logic implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by firmware executing on a processing element, via embedded hardware or the like, or any combination of hardware and firmware. Such components may be implemented as firmware modules, hardware modules, special-purpose hardware (e.g., application specific hardware, ASICs, DSPs, etc.), embedded controllers, hardwired circuitry, hardware logic, etc. Firmware content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A semiconductor apparatus comprising a plurality of integrated circuitry (IC) components, including:

- a host input/output (I/O) interface coupled to a host-side I/O port;
- a power management component;
- memory, comprising at least non-volatile memory in which firmware instructions are stored;
- at least one processing element on which the firmware instructions are configured to be executed; and a device-side I/O interface and router coupled to a plurality of device-side I/O ports, wherein the semiconductor apparatus is configured to be mounted on a memory module having a plurality of Dynamic Random Access Memory (DRAM) devices that are coupled to the device-side ports and wherein execution of the firmware instructions on the at least one processing element enables the semiconductor apparatus to facilitate communication between a host in which the memory module is installed and the plurality of DRAM devices using sideband communication.

2. The semiconductor apparatus of claim 1, wherein the power management component is configured to receive power from power input lines on the memory module and manage power supplied to circuitry and components on the semiconductor apparatus and circuitry and components on the memory module.

3. The semiconductor apparatus of claim 1, wherein the memory module includes a plurality of data buffers (DBs) that are coupled to one or more of the device-side I/O ports when the semiconductor apparatus is mounted to the memory module, and wherein execution of the firmware instructions on the at least one processing element enables the semiconductor apparatus to facilitate communication between the host and the plurality of DBs using sideband communication.

4. The semiconductor apparatus of claim 1, further comprising at least one control register.

5. The semiconductor apparatus of claim 1, wherein the sideband communication employs I2C or I3C buses.

6. The semiconductor apparatus of claim 1, wherein the sideband communications employ the Management Component Transport Protocol (MCTP).

7. The semiconductor apparatus of claim 1, wherein a portion of the memory is configured to implement at least one of a scratchpad and a mailbox.

8. The semiconductor apparatus of claim 1, wherein a portion of the memory includes volatile memory.

9. The semiconductor apparatus of claim 1, further comprising an SPDM (Security Protocol and Data Model) Authentication block configured to implement SPDM to authenticate at least a portion of the firmware instructions.

10. The semiconductor apparatus of claim 1, wherein the device-side I/O interface and router comprises a proxy controller and router employing an I2C or I3C interface configured to route sideband signal over I2C or I3C bus lines coupling the DRAM devices to the device-side ports.

11. A memory module, comprising:

a printed circuit board (PCB) on which a plurality of components and circuitry are mounted and having wiring interconnecting the plurality of components and circuitry;

a plurality of Dynamic Random Access Memory (DRAM) devices;

a plurality of Data Buffers (DBs), coupled to the plurality of DRAM devices;

a memory module management device, having a power management component configured to manage power provided to components on the memory module, having an input/output (I/O) interface coupled to a host side port connected to host sideband signal lines on the memory module, and having an I/O interface and router coupled to a plurality of device-side ports to which the plurality of DRAM devices and DBs are coupled via the wiring in the PCB, wherein the memory module management device further comprises embedded logic configured to facilitate communication between a host in which the memory module is installed, the plurality of DRAM devices, and the plurality of DBs using sideband communication.

12. The memory module of claim 11, wherein the DRAM devices are Double Data Rate $6^{th}$ generation (DDR6) DRAMs.

13. The memory module of claim 11, wherein the embedded logic comprises a microcontroller on which firmware instructions are executed.

14. The memory module of claim 11, further comprising a registered clock device (RCD) that is coupled to a device-side port on the memory management module, wherein the memory module management device further facilitates communication between the host and the RCD.

15. The memory module of claim 11, further comprising one or more temperature sensors that are coupled to one or more device-side ports on the memory management module, wherein the memory module management device is further configured to read the temperature sensors and provide corresponding temperature data to the host.

16. A method implemented by a memory module management device on a memory module installed in a host having a plurality of Dynamic Random Access Memory (DRAM) devices, the memory module management device having a power management component configured to manage power provided to components on the memory module, having an input/output (I/O) interface coupled to host side port connected to host sideband signal lines on the memory module, and having an I/O interface and router coupled to a plurality of device-side ports to which the plurality of DRAM devices are coupled via the wiring in the memory module, the method comprising:

managing power provided to components and circuitry on the memory module including the DRAM devices via the power management component; and facilitating communication between the host and the plurality of DRAM devices using the memory module management device.

17. The method of claim 16, wherein the DRAM devices Double Data Rate $6^{th}$ generation (DDR6) DRAMs.

18. The method of claim 16, wherein the memory module includes a plurality of data buffers (DBs) that are coupled to one or more of the device-side I/O ports via wiring in the memory module, further comprising facilitating communication between the host and the plurality of DBs using the memory module management device.

19. The method of claim 16, wherein the memory module management device includes one of more processing elements on which firmware instructions are executed, further comprising:

employing SPDM (Security Protocol and Data Model) authentication using logic in the memory module management device to authenticate at least a portion of the firmware instructions.

20. The method of claim 16, wherein communication between the host and the plurality of DRAM devices comprises routing sideband signals over I2C or I3C buses using the Management Component Transport Protocol (MCTP).

* * * * *